(12) United States Patent
Rowe et al.

(10) Patent No.: US 6,640,750 B2
(45) Date of Patent: Nov. 4, 2003

(54) ELECTRIC FELINE PLAY CENTER

(76) Inventors: Tina Rowe, 9943 N. 77th Ave., Peoria, AZ (US) 85345; Chester Wood, Jr., 9943 N. 77th Ave., Peoria, AZ (US) 85345

(*) Notice: Subject to any disclaimer, the term of this patent is extended or adjusted under 35 U.S.C. 154(b) by 0 days.

(21) Appl. No.: 10/062,792

(22) Filed: Jan. 31, 2002

(65) Prior Publication Data

US 2003/0140869 A1 Jul. 31, 2003

(51) Int. Cl.$^7$ .............................................. A01K 29/00
(52) U.S. Cl. ...................................... 119/706; 119/707
(58) Field of Search ................................ 119/702, 706, 119/707, 708; 273/144 B

(56) References Cited

U.S. PATENT DOCUMENTS

| | | | |
|---|---|---|---|
| 1,371,194 A | * 3/1921 | Bird | ........................ 273/144 B |
| 3,604,397 A | 9/1971 | Salerno | |
| 3,993,027 A | 11/1976 | Mullin | |
| 4,177,763 A | 12/1979 | Cook | |
| 4,517,922 A | * 5/1985 | Lind | ........................... 119/708 |
| 4,786,056 A | * 11/1988 | Dunnigan | ............... 273/144 A |
| D334,254 S | 3/1993 | Mitchell | |
| D334,637 S | 4/1993 | Mitchell | |
| 5,611,721 A | * 3/1997 | Hoeting et al. | ............. 446/419 |
| 5,657,721 A | 8/1997 | Mayfield et al. | ............ 119/707 |
| D386,839 S | 11/1997 | Jennus | |
| 5,829,390 A | 11/1998 | Jonilla et al. | ............... 119/706 |
| 5,913,750 A | 6/1999 | Smithback | .................... 482/54 |
| 6,058,887 A | 5/2000 | Silverman | .................... 119/609 |
| 6,168,155 B1 | * 1/2001 | Kuhlman et al. | ........ 273/144 A |
| 6,253,712 B1 | * 7/2001 | Johnson | ...................... 119/707 |

* cited by examiner

Primary Examiner—Robert P. Swiatek
(74) Attorney, Agent, or Firm—Wheeler Law Offices, P.C.; Linda D. Wheeler, Esq.

(57) ABSTRACT

An electric feline play center having a tunnel, sized for a cat to fit through, a scratching post with a hanging chew toy and an electronic ball tube wherein a fan blows colored balls around within a mesh tube, devised to occupy one or more cats without need of the pet owner's direct presence.

2 Claims, 3 Drawing Sheets

ELECTRIC FELINE PLAY CENTER

FIELD OF THE INVENTION

The present invention relates generally to a feline play center. More specifically, the present invention relates to an electric feline play center.

BACKGROUND OF THE INVENTION

Felines, cats, not only have physical needs such as food, water, exercise and shelter, but they also have the emotional need for companionship and entertainment. Automated food feeders and full water bowls will work to fulfill the cat's physical needs when its owner is away. The emotional needs of a cat are hard to provide for when the owner is away at work or on vacation or is just plain busy and does not have time to play with the cat one evening. Fulfilling the emotional needs of a feline is even more important in a kitten that may find itself alone for the very first time in its life. Insecurity in animals can often lead to negative behavior and destructive habits such as clawing and scratching furniture, carpets, climbing curtains, etc. Accordingly, a need exists for a means by which cats can be provided with behaviorally acceptable entertainment to occupy them when their owner is away. The present invention fulfills this need.

Many non-electrical entertainment devices for felines have been invented. U.S. Pat. No. 5,829,390 issued to Jonilla et al discloses a door-mounted, scratch, exercise and perch structure for cats. U.S. Pat. No. 4,177,763 issued to Cook discloses a cat scratching post assembly. U.S. Pat. No. 3,604,397 issued to Salerno discloses and cat perch and exercise pole. U.S. Design Patent No. Des. 386,839 issued to Jennus discloses a cat scratching post covered with the backside of carpeting. U.S. Design Patent No. Des. 334,637 issued to Mitchell discloses a cat scratching post. As mentioned, all of these inventions require manual stimulation by the feline or the feline's owner. None of the above inventions incorporate electricity to initiate the interest of the feline allowing the feline to be amused by the device while the owner is away. The present invention does.

As do the following: U.S. Pat. No. 6,058,887 issued to Silverman discloses a cat amusement device that mimics a flying bird. U.S. Pat. No. 5,913,750 issued to Smithback, discloses a feline treadmill. U.S. Pat. No. 5,657,721 issued to Mayfield et al., also discloses an electronic device that mimics the potential prey of a feline. None of these inventions incorporate the movement or color of the present invention needed not only to attract the attention of a feline, but to keep it.

SUMMARY OF THE INVENTION

The present invention, the electric feline play center, is used to entertain feline pets while a pet owner is busy with other things or is away at work or on vacation. The electric feline play center mixes traditional feline entertainment and functional devices with an electrical feature devised to attract and keep the attention of a feisty feline. The device has a base that allows easy portability. Connected to the base, in the preferred embodiment, is a cat scratching post atop of which is a chew toy mobile that is connected to the scratching post allowing the feline to bat the toy around with its paws. The base further has a tunnel connected thereto that is large enough for the feline to walk through. Lastly, the base has a mesh ball tube that has an electric fan at one end for blowing colored balls up in the air, thus attracting the attention of the cat to the electric feline play center.

It is an object of the present invention to provide a play center for felines that attracts and keeps the attention of felines whether their owner is present or away.

It is a further object of the present invention to provide a safe play center for felines.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
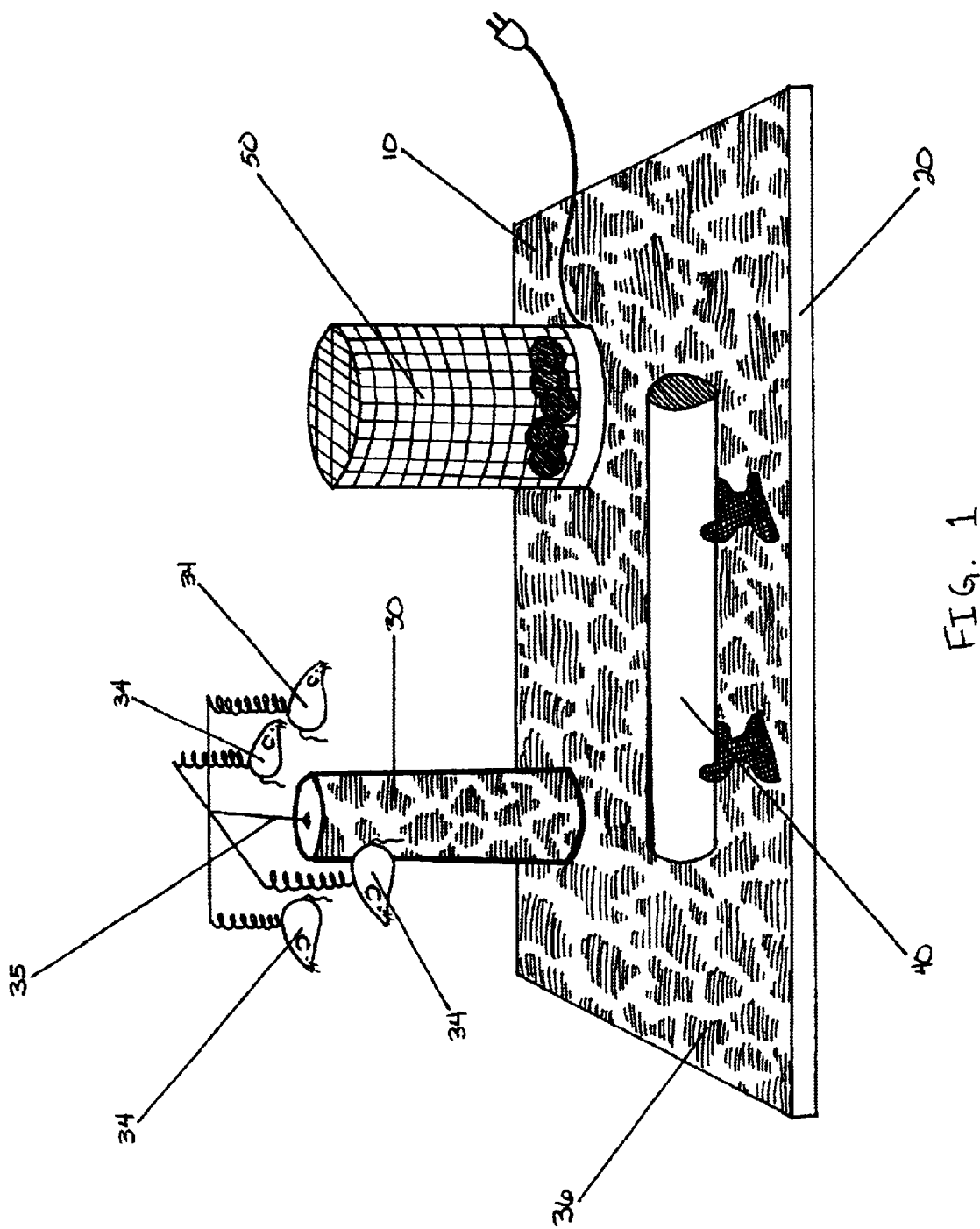
FIG. 1 is a perspective view of the electric feline play center.

The preferred embodiment of the present invention, the electric feline play center 10, is shown in FIG. 1. The electric feline play center 10 is devised from a number of different pieces. In the preferred embodiment, the electric feline play center 10 has a base 20, a scratch post 30 with a mobile 35, a tunnel 40, and a ball tube 50. One of ordinary skill in the art would readily recognize that the electric feline play center 10 could have any number of different pieces as long as it includes the main feline attraction, the ball tube 50.

Figure 2:
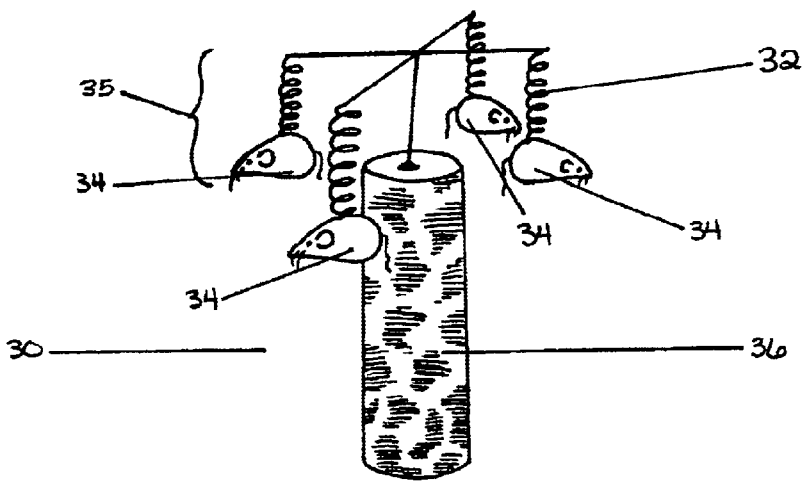
FIG. 2 is perspective view of the scratch post and mobile.

FIG. 2 illustrates the scratch post 30 of the preferred embodiment. In its preferred embodiment, the scratch post 30 is a cylindrical post 38 made out of any durable material such as wood, metal or plastic and covered with carpeting 36. The carpeting 36 can be of any type and any color. One of ordinary skill in the art would readily recognize the most prudent types of carpet to use and would further recognize that rope, twine, bare wood, etc. can be used to create a scratching surface for cats instead of carpet. The bottom of the scratch post 30 is attached to the base 20. It is preferred that the scratch post 30 be nailed to the base 20, but it can be attached in any number of different ways including being removably screwed into the base 20, glued onto the base 20, etc. It is preferred that the base 20 is made from a durable material such as wood, metal or plastic and is covered with carpet of a type and color desired by the user or manufacturer. One of ordinary skill in the art would recognize that the base 20 need not be covered by carpet or any material, but can be covered by a number of different materials including fabric. Atop the scratch post 30 is a mobile 35. It is preferred that said mobile 35 can be attached such that it can be manually rotated by the cats. One of ordinary skill in the art would recognize that the mobile 35 has a number of feline chew toys 34 suspended in the air on springs 32. The springs 32 are securely fastened to the extension posts 37 of the mobile 35 such that the user cat can bat or chew on the chew toy 34 without pulling the chew toy 34 or the spring 32 loose from the extension posts 37.

Figure 3:
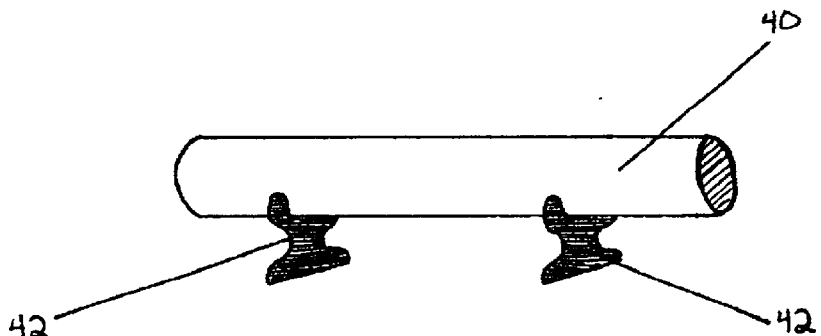
FIG. 3 is a perspective view of the tunnel.

FIG. 3 shows the tunnel 40 of the preferred embodiment. It is preferred that the tunnel 40 be cylindrical in shape and be constructed from a clear, transparent plastic. One of ordinary skill in the art would recognize; however, that the tunnel 40 need not be clear or transparent, it can be rectangular in shape and can be made out of any number of materials, including, but not limited, to, wood. In the preferred embodiment, the inside, bottom of the tunnel 40 is carpeted. It is further preferred that the tunnel 40 be coupled to supports 42 that are in turn coupled to the base 20 such that the tunnel 40 is not lying directly on the base 20 although one of ordinary skill in the art would realize that the tunnel 40 can be couple directly to the base 20. The supports 42 can be of any design and can be made of any material, wood, plastic, metal, etc. that is durable enough to support the weight of at least two felines together with the weight of the tunnel 40 so that it does not collapse. It is preferred that the supports 42 be of such a height to allow a cat to lay underneath the tunnel 40.

Figure 4:
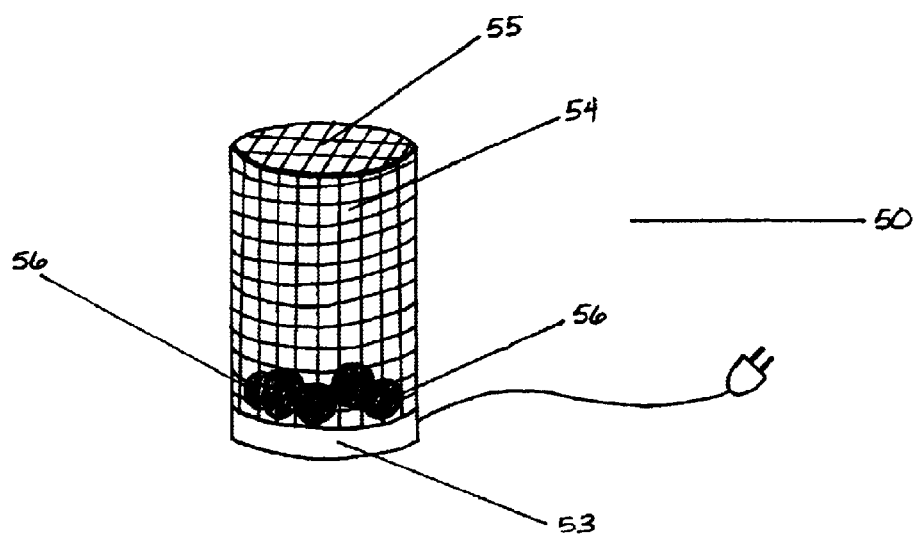
FIG. 4 is a perspective view of the ball tube.
Figure 5:
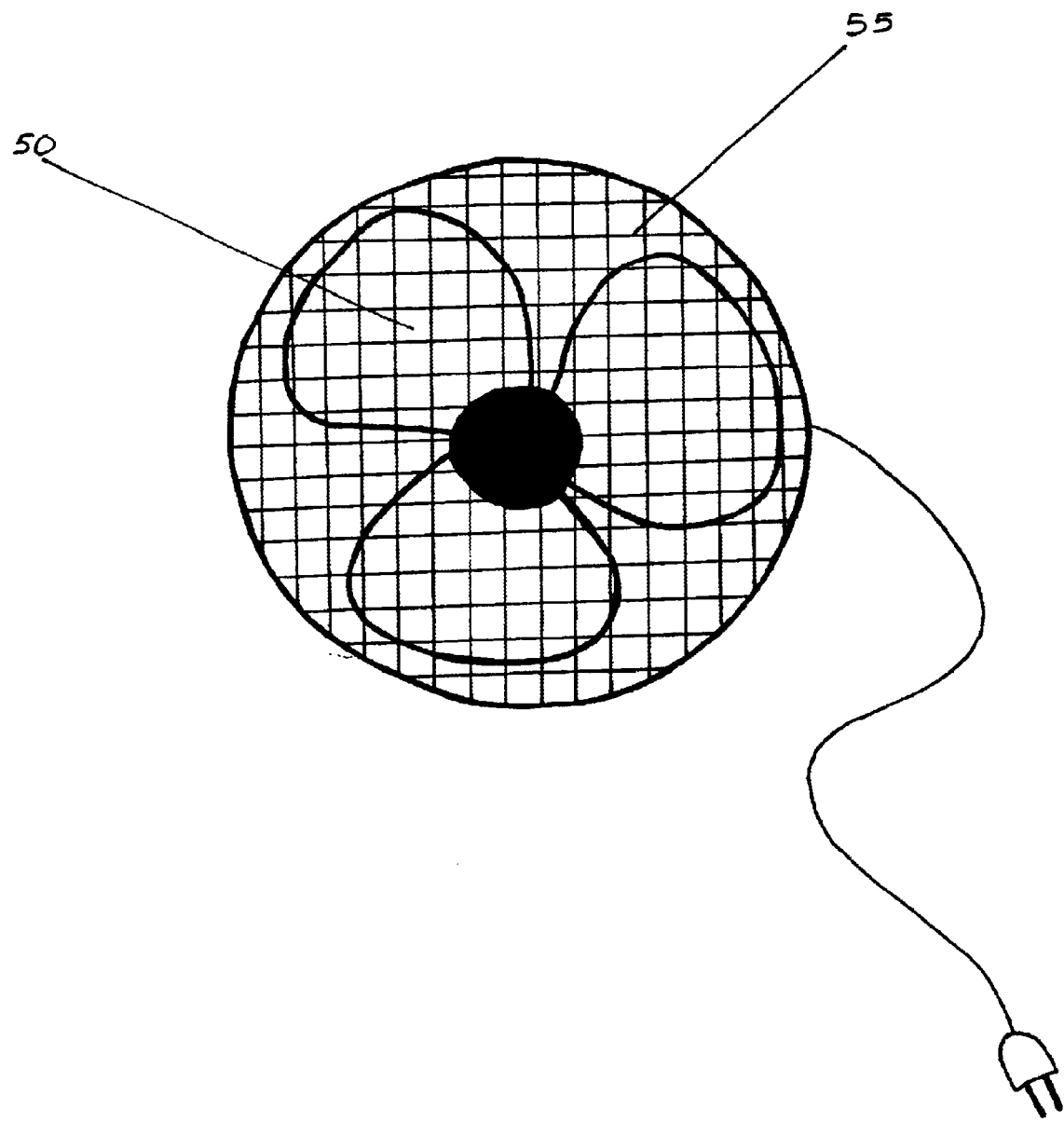
FIG. 5 is atop view of the ball tube without any balls therein, thus revealing the fan/blower mechanism.

FIGS. 4 and 5 illustrate the ball tube 50. In the preferred embodiment, the ball tube 50 is a vertical cylindrical mesh tube 54. The mesh should be tight enough so that a feline can barely fit a claw through. This prevents the cats from having access to fee balls 56 within the mesh-tube 54 and from having access to the blade of the electric fan 52 within the ball tube 50. The ball tube 50 has a small electrical fan 52 that is connected to a motor (not shown), much like a small portable hand held fan or a small fan used in a computer to cool the components thereof, located at the bottom of the ball tube 50. The motor is electrically wired such that it can be turned on and off by plugging and unplugging the device into a standard electrical outlet. In an alternative embodiment, the ball tube 50 has a timer such that the ball tube 50 will automatically shut off at the set time. Within the mesh tube 54 are a number of colored balls 56. The balls 56 are preferably made out of cloth or yarn and can be any color imaginable. One of ordinary skill in the art would readily recognize that the balls 56 need not be made out of cloth or yarn, but can bed made out of any material that is light enough to allow the fan 52 to lift the balls up into the air within the mesh tube 54. It is preferred that the mesh tube 54 has a cover 55, made out of mesh, plastic, etc., to prevent the balls 56 from being blown out of the mesh tube 54. In the preferred embodiment, the cover 55 is removable to allow the owner access to replace or add more balls. The fan 52 is preferably housed in a housing 53 that prevents the balls 56 from ever touching the blades of the fan 52.

Although this invention has certain preferred embodiments, it will be obvious to those skilled in the art that various changes and modifications may be made therein without departing from the invention, and all such changes and modifications are intended to fall within the true spirit and scope of the invention.

What is claimed is:

1. An electric feline play center comprising:
   a platform;
   a scratching post attached to said platform, said scratching post having a cat toy mobile attached to the top thereof; and,
   a caged ball toy attached to the platform, said caged ball toy having an electric blowing mechanism housed within a screened cage, said screened cage also housing a plurality of lightweight balls.

2. An electric feline play center comprising:
   a platform;
   an elevated tunnel attached to said platform;
   a scratching post attached to said platform, said scratching post having a cat toy mobile attached to the top thereof; and,
   a caged ball toy attached to the platform, said caged ball toy having an electric blowing mechanism housed within a screened cage, said screened cage also housing a plurality of lightweight balls.

\* \* \* \* \*